United States Patent [19]
Hudcovic et al.

[11] Patent Number: 5,172,835
[45] Date of Patent: Dec. 22, 1992

[54] DEVICE FOR DOSING PRODUCTS IN PAST FORM, IN PARTICULAR MEAT OR OTHER PROTEIN EMULSIONS

[75] Inventors: Robert Hudcovic, Achim; Erich Mengel, Verden; Bruno Trachez, Kirchlinteln, all of Fed. Rep. of Germany

[73] Assignee: Unisabi, S.A., Saint-Denis-de-l'Hotel, France

[21] Appl. No.: 720,782
[22] PCT Filed: Jan. 5, 1990
[86] PCT No.: PCT/FR90/00008
  § 371 Date: Jul. 31, 1991
  § 102(e) Date: Jul. 31, 1991
[87] PCT Pub. No.: WO90/07695
  PCT Pub. Date: Jul. 12, 1990

[30] Foreign Application Priority Data
  Jan. 6, 1989 [FR] France ................. 89 00107

[51] Int. Cl.⁵ ............................................. B67D 5/40
[52] U.S. Cl. ..................................... 222/380; 222/387
[58] Field of Search .......... 222/380, 387, 309, 216-218

[56] References Cited
U.S. PATENT DOCUMENTS

| | | | |
|---|---|---|---|
| 2,070,841 | 2/1937 | Reade et al. | 222/309 X |
| 2,202,073 | 5/1940 | Wollenweber | 222/309 X |
| 2,356,420 | 8/1944 | Monroe | 222/387 |
| 2,684,186 | 7/1954 | Mattos | 222/218 |
| 3,731,715 | 5/1973 | Gageant et al. | 222/309 X |
| 4,055,281 | 10/1977 | Rosen et al. | 222/309 |
| 4,684,040 | 8/1987 | Jonovic et al. | 222/218 X |

FOREIGN PATENT DOCUMENTS
2071220  9/1971  France ................ 222/380

Primary Examiner—Kevin P. Shaver
Attorney, Agent, or Firm—Curtis, Morris & Safford

[57] ABSTRACT

A device for metering products in paste form is provided including a metering chamber having at one of its ends a common filling and discharge opening. A metering plunger is reciprocally mounted within the metering chamber. The product is supplied in paste form into the metering chamber. A distributing cylinder is provided generally perpendicular to the metering chamber and has three lateral openings; namely: a first opening, a second opening facing the first opening, and a third opening axially offset relative to the first two openings. The distributing cylinder also includes a slide valve having a lateral channel and an axial channel. The slide valve is axially movable between: (a) a filling position, wherein the lateral channel connects the first and third openings; (b) an isolating position wherein the three openings of the distributing cylinder are closed; (c) a discharge position where the axial channel connects said first and second openings in order to discharge the dose of product in paste form into a container which has been placed underneath the second opening; and (d) returning the slide valve to the above filling position.

7 Claims, 3 Drawing Sheets

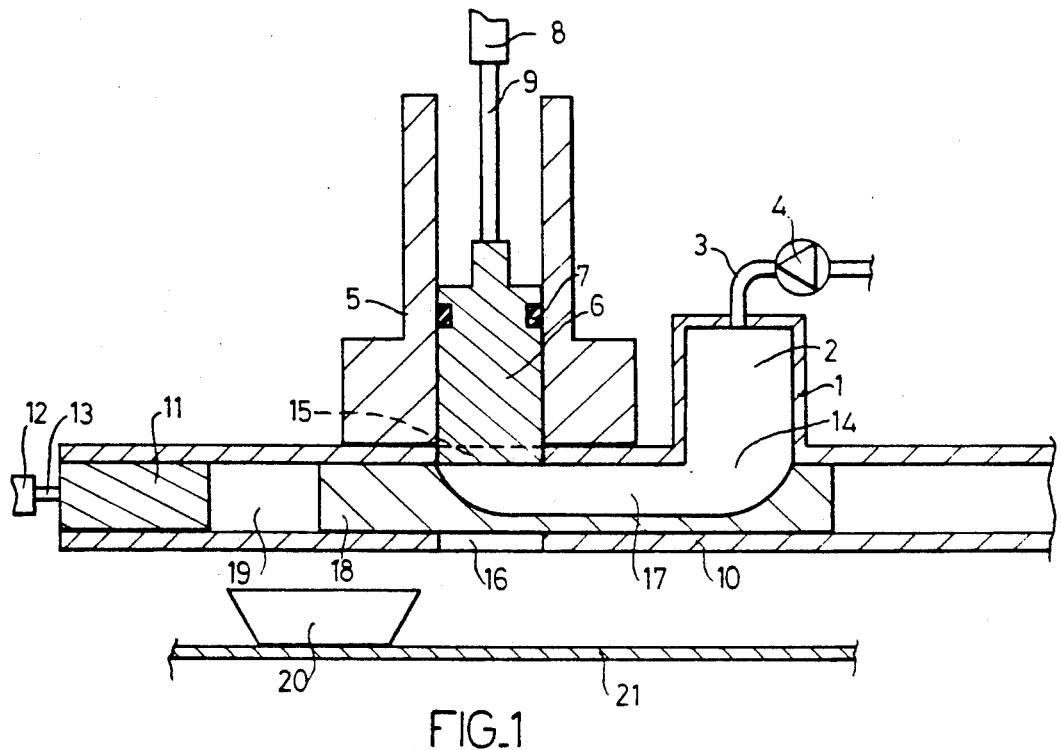
FIG_1
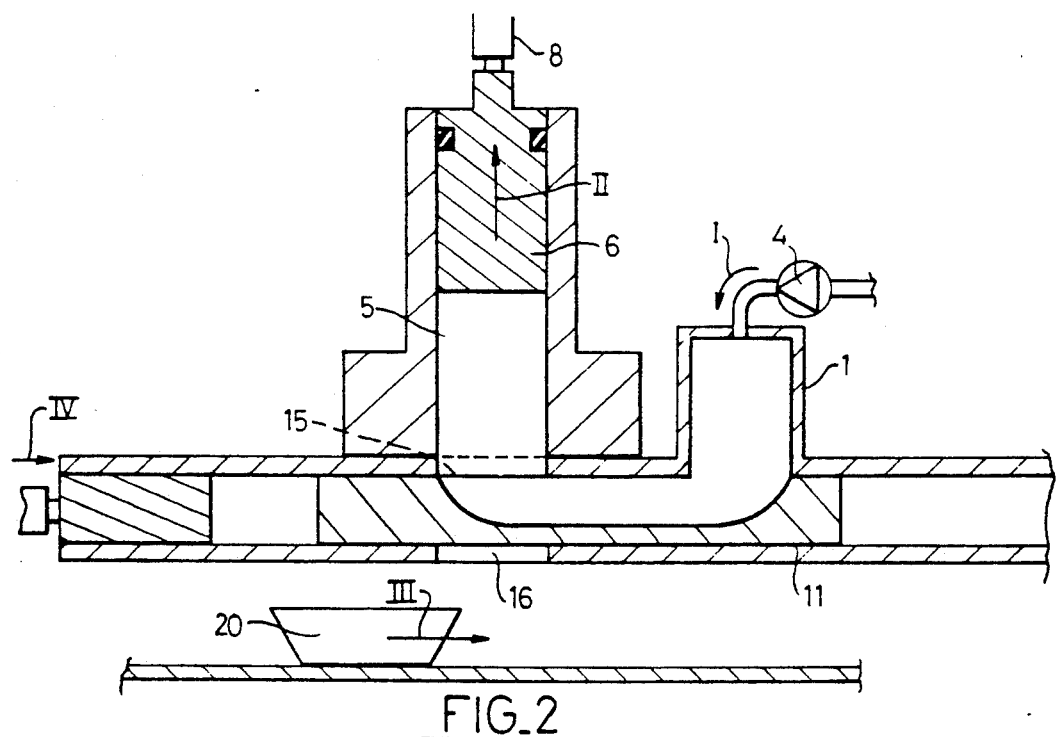
FIG_2

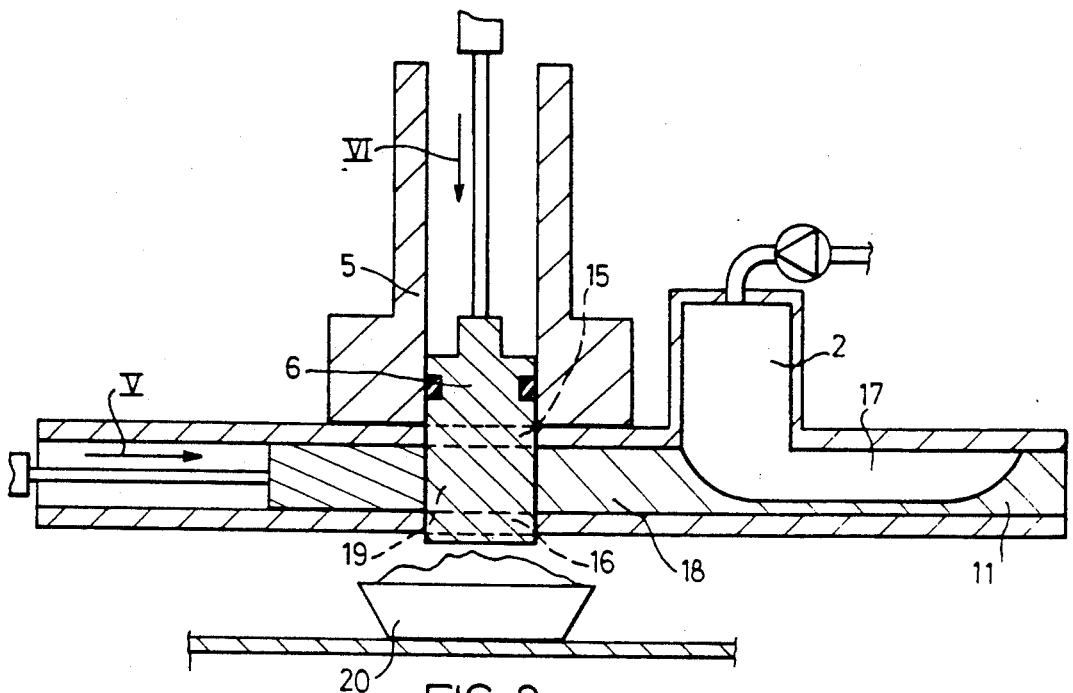
FIG_3
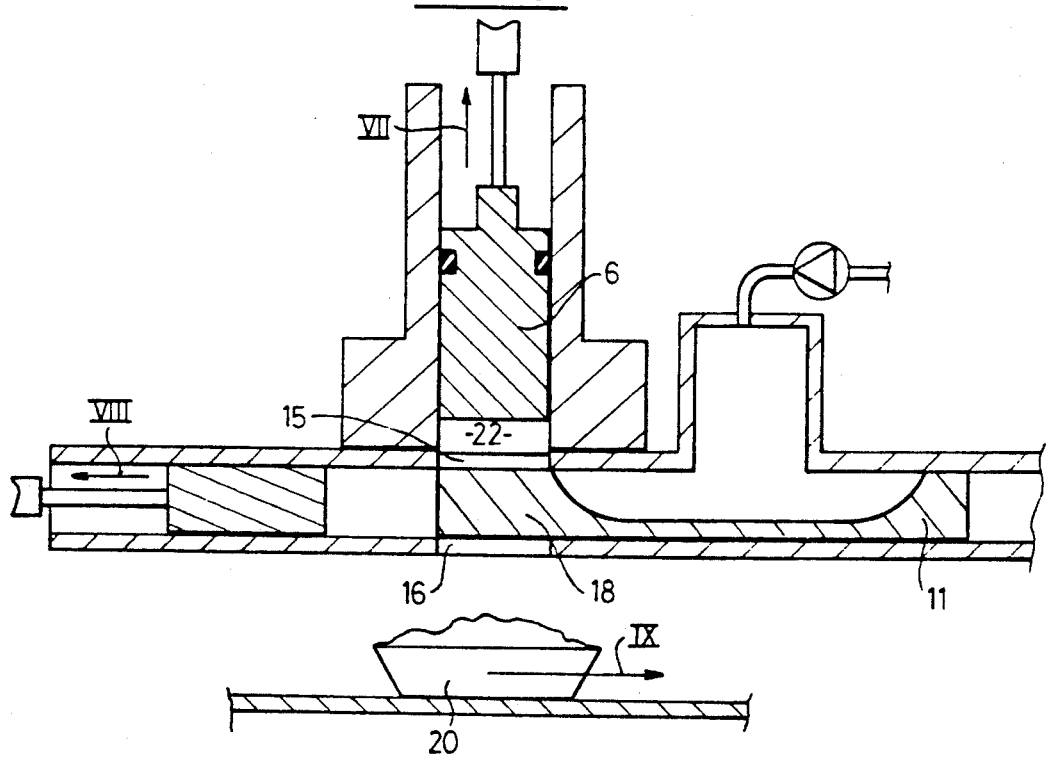
FIG_4

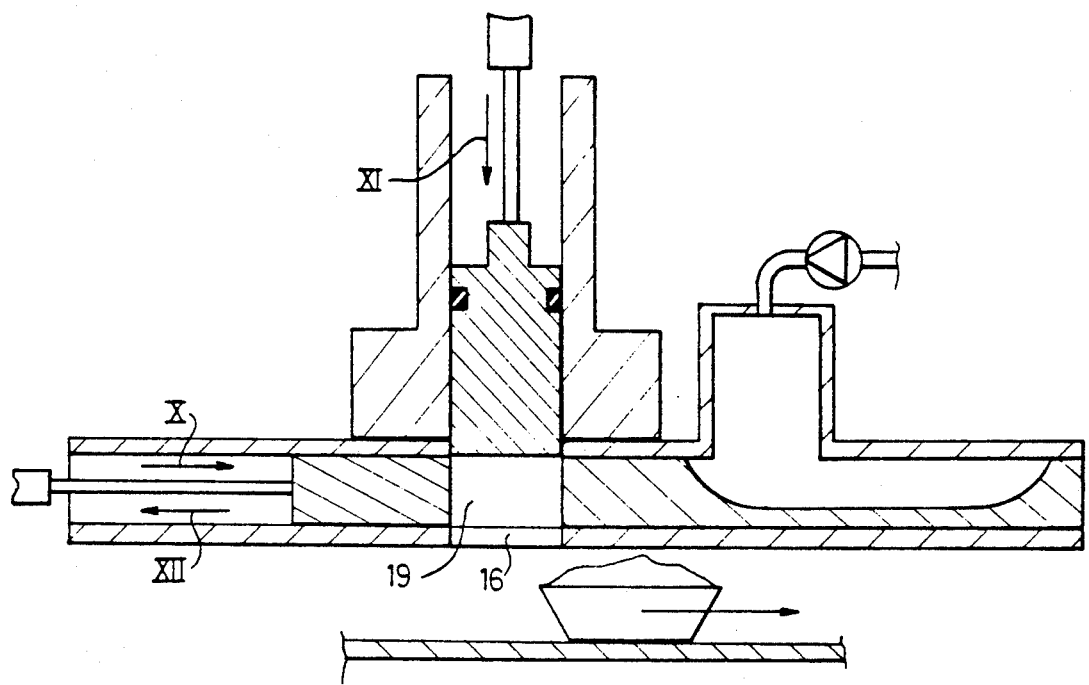
FIG_5

DEVICE FOR DOSING PRODUCTS IN PAST FORM, IN PARTICULAR MEAT OR OTHER PROTEIN EMULSIONS

FIELD OF THE INVENTION

The present invention relates to a device for metering of pasty products and more particularly to a devise for the metering of emulsions of meat or other proteins packed in containers such as cans or troughs.

BACKGROUND OF THE RELEVANT ART

As background, as used herein, the term "pasty products" is defined as a product capable of forming an adherent mass, but whose consistency nevertheless allows it to be pumped. In other words, a pasty product exhibits coherent mass flow when a pressure is applied to it, either mechanically (such as, the action of a plunger) or pneumatically (such as, by pressurizing of a vessel).

When filling containers with a pasty product, it is extremely desirable to develop a system wherein the container is filled cleanly with the pasty product and the pasty product is precisely metered into the container.

First, it is desirable to fill the container cleanly without soiling its edges. Maximum cleanliness along the closure zones of the container, in turn, maximizes the leakproofness of the container, particularly in the case where this closure is effected by heat sealing.

This requirement leads to particular difficulties if the pasty product is of fibrous texture, which further increases the volume of product capable of adhering to the metering head. In this situation the fibres hanging from the metering head are capable of soiling the closure zones of the container as it arrives and departs.

Second, the greatest possible metering precision is desirable in order to ensure as complete a filling as possible of the container with the minimum residual volume or space from the closure head.

In order to ensure a precise metering, the prior volumetric metering devices typically end of a metering plunger sliding in a cylinder connected, on the one hand, to a supply conduit communicating with a pressurized chamber containing the pasty product and, on the other hand, to a delivery conduit permitting delivery of the metered product towards the container.

Systems of valves placed on the supply conduit and on the delivery conduit ensure correct order of the pumping phases (filling/delivery) in synchrony with the movement of the plunger.

In order to achieve clean filling, in prior metering devices for pasty products, a cutting system, for example a guillotine, is provided at the outlet of the delivery conduit. Such a cutting system permits the metered portion to be separated from the dead volume of product remaining in the delivery conduit and in the metering cylinder.

In addition to its mechanical complexity (valves to synchronize with the movement of the plunger, guillotine system, etc), the prior system has the disadvantage of always leaving a dead volume where the product is capable of accumulating. For this reason, this dead volume risks damaging the biological quality of the product being metered because of the possible development of germs therein.

OBJECTS OF THE INVENTION

Therefore, it is an object of the present invention to provide a device for metering of a pasty product which avoids the aforementioned disadvantages of the prior art.

Another object of the present invention is to provide a volumetric metering device which is mechanically very simple and, in particular, does not employ valves in the supply and delivery conduits, as well as a guillotine in the final cutting device.

A further object of the present invention is to provide a device for metering of a pasty product which; totally omits the dead volume of the distribution system.

Another object of this invention is to provide a device for metering of a pasty product which is designed so that a portion of product pumped into the cylinder is entirely and directly delivered into the container, thereby simultaneously providing for the precise metering and the desired elimination of dead volumes.

An additional object of this invention is to provide a device for metering a pasty product which simply protects the closure zones of the container from any possible trace of product which would be hanging over the container before removal of the latter; which is particularly advantageous as regards products having a more or less fibrous texture, as is often the case with meat emulsions.

Various other object, advantages and features of the present invention will become readily apparent from the ensuring detailed description, and the novel features will be particularly pointed out in the appended claims.

To this end, the device for metering products in paste form of the present invention is characterized in that it comprises:

a metering chamber provided, at one of its ends, with a common filling and delivery opening, a metering plunger disposed in the metering chamber and movable axially from a reference position, leaving no residual volume of pasty product remaining inside the metering chamber, to a raised position defining the metered volume of pasty product, means for supply of pasty product into the metering chamber under pressure, a distribution cylinder oriented transversely relative to the metering chamber and provided laterally with a first opening defining the filling and delivery opening of the metering plunger, a second opening disposed axially opposite this first opening, and a third opening offset axially relative to the first two openings and communicating with the means for supply of pasty product, a distributor slide is disposed within the distribution cylinder and includes a lateral conduit for communication between two points offset axially relative to each other, and an axial conduit for communication between two points situated axially opposite to each other. The distributor slide being movable axially between, successively: (a) a filling position, wherein the lateral conduit opens the said first and third openings into communication with one another and also closes the said second opening of the distribution cylinder so as to permit filling of the metering chamber via the supply means; (b) an isolating position, wherein after the metering plunger has reached its raised position, the three openings of the distribution cylinder are closed; (c) a delivery position, wherein while the metering plunger is lowered towards its reference position, the third opening remains closed, and the axial conduit opens the said first and second openings into communication with each other so as to deliver a portion of pasty product into a container previously placed opposite to the second opening; and (d) repeating the filling position mentioned above, and means for selective actuation of the metering plunger and the distributor slide.

Very advantageously, in the delivery position (c) and after delivery, the metering plunger is raised to an intermediate position above its reference position so as to remove, at a distance from the container, the remaining adherent mass of pasty product attached to the plunger after delivery.

In this latter case, between positions (c) and (d) mentioned above, the distributor cylinder preferably passes through another isolating position which permits withdrawal of the filled container, thereby isolating the container from the remaining adherent mass of pasty product attached to the plunger after delivery.

In the same way, before the filling operation is repeated as at position (d) above, the distributor cylinder preferably passes through another delivery position in which the metering plunger is displaced from its intermediate position towards its reference position so as to deliver into the axial conduit the remaining mass of pasty product attached to the plunger. The axial conduit being sized so that this delivered adherent mass does not extend beyond the axial conduit via the second opening in the distribution cylinder.

According to another advantageous characteristic of the present invention, the first opening in the distribution cylinder and the axial conduit of the distributor slide are substantially of the same cross-section as the metering plunger so that, in the delivery position, the metering plunger can be lowered beyond its reference position in such a way as to penetrate into the axial conduit of the distributor slide.

In this latter case, the second opening in the distribution cylinder is also substantially of the same cross-section as the metering plunger so that, in the delivery position, the metering plunger penetrates totally into the axial conduit of the distributor slide and emerges from the distribution cylinder via this second opening.

BRIEF DESCRIPTION OF THE DRAWINGS

The following detailed description, given by way of example but not intended to limit the invention solely to the specific embodiment described, may best be understood in conjunction with the accompanying drawings in which:

FIGS. 1 to 5 are cross-sectional views of a preferred embodiment of the metering device of the present invention illustrating its successive operating phases.

DETAILED DESCRIPTION OF THE PREFERRED EMBODIMENT

Referring now to the drawings, wherein like reference numerals are used throughout, and the sequence of operation of the various elements of the metering device of the present invention is illustrated.

FIG. 1 illustrates all the elements of the metering device according to the invention, in the position which the latter occupies at the start of a cycle (i.e. before filling of the metering chamber).

This device includes a system for supply of pasty product, with an enclosure 1 forming a buffer volume for the pasty product 2 delivered from a storage vessel via a supply conduit 3. The pasty product is forced into the buffer enclosure 1 by being pressurized, for example by means of a pump 4 inserted in the supply conduit 3 (and/or by pressurizing of the residual volume at the top of the storage vessel).

The pasty product is metered by means of a metering chamber 5 in which a metering plunger 6 is slidably received therein. The metering plunger 6 is provided, if necessary, with a sealing ring 7. The movement of the metering plunger is effected, for example, by a jack 8 to which it is connected via the rod 9 in such a way as to permit travel of the metering plunger between a reference position (the position illustrated in FIG. 1), wherein the metering plunger is lowered to the bottom of the metering chamber, without dead volume, and a raised position (illustrated in FIG. 2), wherein the volume of the portion of pasty product to be delivered if defined.

The metering chamber 5 is in the form of a bottomless cylinder having a vertical axis. It should be noted that the vertical arrangement of the metering chamber is generally that which is most satisfactory, given the tendency of the pasty product to flow by gravity. Although this arrangement is preferable, it is not however indispensable to the use of the device of the invention, and although use will be made of terms such as "raised position", "lowering of the plunger", etc., these terms should not be regarded as excluding any other possible arrangement of the various elements.

A distribution cylinder 10 is provided generally perpendicular to the metering chamber (which is thus horizontal in the preferred configuration) in which a distributor slide 11 slides axially under the action, for example, of a jack 12 to which it is connected via the rod 13.

The distribution cylinder 10 is provided with three lateral openings.

The first of these openings, opening 15 in the upper part, is in line with the bottom of the metering chamber 5; this first opening 15 has the same cross-section as the metering chamber 5, so that the metering plunger 6, when it is in its reference position (the position illustrated in FIG. 1), penetrates, beyond the bottom of the metering chamber 5, inside this opening 15 and comes into contact with the distributor slide 11, thus leaving no dead volume at this location.

The second opening 16 in the distribution cylinder is formed in the lower part, opposite the first opening 15 and has the same dimensions as the latter.

Finally, the distribution cylinder 10 inlcudes a third opening 14 offset axially relative to the first two openings 15 and 16. The third opening 14 communicates directly with the buffer enclosure 1 for supply of pasty product. This opening 14 has been shown in the drawing in the upper part of the distribution cylinder 10, but this arrangement is not indispensable, since gravity plays no role with respect to the supply of pasty product since the latter is delivered under pressure by the appropriate means set forth above.

The distributor slide 11 is formed of three successive parts.

The first part comprises a blind elongate cavity forming a lateral conduit 17 which permits, in the configuration illustrated in FIG. 1, the openings 14 and 15 to be brought into communication, with one another and thus the buffer enclosure 1 of the supply system with the metering chamber 5.

The second part 18 of the distribution cylinder, adjacent to the previous part, is a solid part forming an isolating element.

Finally, the third part, adjacent to the isolating part 18, comprises an opening passing right through the distribution cylinder and forming an axial conduit 19 (whereas the lateral conduit 17 is a blind conduit). The axial conduit 19 has the same cross-section as the metering chamber and the openings 15 and 16 so as to allow the metering plunger 6 to pass through all of these elements when the axial conduit 19 is placed in line with the metering chamber (which corresponds to the configuration in FIG. 3, which will be explained hereinbelow).

Finally, below this metering device, a container 20, such as a trough or can, etc., can be positioned just below the opening 16 by virtue of a conveyor 21 such that the container can be filled. The conveyor also permits the removal of the container 20 from beneath opening 16 after the container has been filled.

The operation of this metering device will now be described.

In the starting position, illustrated in FIG. 1, the metering plunger 6 is lowered to its reference position in which it is in contact with the upper face of the distributor slide 11. In this reference position, no dead volume is present either at the bottom of the metering chamber 5 or at the site of the opening 15 of the distribution cylinder 10.

The distributor slide 11 is placed in its extreme left position (as shown in the figure) in such a way that the lateral conduit 17 brings the buffer enclosure 1 into communication with the metering chamber 5. Further, the lower opening 16 remains closed due to the blind lateral conduit 17 does not pass through the distributor slide 11.

Then (arrow I in FIG. 2) the pasty product can be pumped so as to fill the metering chamber 5 until the plunger reaches (arrow II) its upper end position; the portion of pasty product to be delivered is thus defined by the volume of the metering chamber 5 (added to that of the opening 15, the thickness of the distribution cylinder 10 never being zero).

The filling of the metering chamber 5 can be effected either by the action of the pump 4 (positive pressure) or by active lifting of the metering plunger 6 by the jack 8 (a negative pressure), or alternatively by a combination of these two actions.

The container 20 to be filled can then be positioned (arrow III) below the opening 16, which is still closed.

The isolation of the portion contained in the lateral conduit 17 is then carried out by displacing the distributor slide 11 to the right (arrow IV in FIG. 3) so that its solid part 18 is opposite the opening 15, with the lateral conduit 17 thus being isolated, the flow of pasty product from the buffer enclosure 1 is interrupted.

The distributor slide 11 is then subjected to an additional displacement to the right (arrow V) in order to move the slide 11 to its end position (the position illustrated in FIG. 3), where the axial conduit 19 is aligned with the two openings 15 and 16, which are thereby brought into communication with each other. The metering plunger 6 can then be lowered (arrow VI) so as to deliver the portion of pasty product, initially contained in the metering chamber, into the container 20 which has been placed below the opening 16 during the preceding stage.

The lowering of the cylinder is very advantageously carried out into a position which allows it, having passed through the opening 15, the axial conduit 19 and the opening 16, to lie flush with this opening or to extend slightly from it. In this position no quantity of pasty product remains in the dead volumes of the various elements of the device.

The metering plunger 6 is then lifted (arrow VII in FIG. 4) slightly above its reference position in such a way as to leave a space 22 between the distributor slide 11 and the metering plunger 6. In this space 22, the adherent remaining mass of pasty product attached to the plunger after delivery will be driven thereinto and isolated therein.

The distributor slide 11 is then displaced to the left (arrow VIII) so that its solid region 18 is opposite the openings 15 and 16 (position illustrated in FIG. 4).

In this way, having removed the adherent mass with possible fibres of product which remain attached to the metering plunger, the metering chamber and the filled container 20 are isolated in such a way that it will be possible to withdraw the latter (arrow IX) without a risk of soiling its closure zones.

The following stage consists in lowering the metering plunger 6 to its reference position (arrow XI in FIG. 5).

This has the effect of driving the remaining adherent mass into the axial conduit 19. The dimensions of the distributor slide 11 are chosen so that, given the consistency of the pasty product, this remaining mass does not extend through the opening 16.

The slide is then displaced to the left (arrow XII), and this allows it to return to the initial position (as shown in FIG. 1). The mass of pasty product remaining in the axial conduit 19 remains isolated in this axial conduit and will be completely expelled during the next delivery phase, at the same time as the portion contained in the metering chamber 5.

While the present invention has been particularly shown and described with reference to a preferred embodiment, it will be readily appreciated by those of ordinary skill in the art that various changes and modification may be made therein without departing from the spirit and scope of the invention. It is intended that the appended claims be interpreted as including the foregoing as well as various other such changes and modifications.

What is claimed is:

1. A device for volumetric metering of pasty products into a container comprising:

a metering chamber provided, at one of its ends, with a common filling and delivery opening a metering plunger is disposed within the metering chamber and is movable axially between a reference position, wherein no residual volume of the pasty product remains inside the metering chamber, to a raised position wherein a metered volume of pasty product is received within said metering chamber, means for supplying the pasty product under pressure into said metering chamber, a distribution cylinder disposed transversely relative to the metering chamber and provided laterally with a first opening defining said filling and delivery opening of said metering plunger, a second opening disposed axially opposite to said first opening, and a third opening offset axially relative to the other two said openings and in communication with said means for supply of pasty product;

said distribution cylinder including a distributor slide having a lateral conduit for communication between first and second positions offset axially relative to each other, and an axial conduit for communication between first and second positions disposed axially opposite to each other, said distributor slide being movable axially between:
(a) a filling position, wherein the lateral conduit is moved such that said first and third openings are opened into communication with one another and said second opening of the distribution cylinder is closed so as to permit filling of said metering chamber via said supply means,
(b) an isolating position, wherein after said metering plunger reaches its raised position, each of said three openings of said distribution cylinder is closed,
(c) a delivery position, wherein while the metering plunger is lowered towards its said reference position, the third opening remains closed, and said axial conduit is moved so that the said first and second openings are opened so as to deliver a portion of pasty product into the container which is place opposite to said second opening, and when said metering plunger reaches its said reference position, said metering plunger pentrates through said axial conduit of said distribution cylinder such that no quantity of pasty product is contained within said second opening, and
means for selective actuation of said metering plunger and distributor slide for movement of the same.

2. The device of claim 1 wherein after said distribution cylinder is moved into said delivery position, said metering plunger is raised to an intermediate position above its said reference position so as to remove, at a distance from the container a remaining adherent mass of pasty product attached to the plunger after delivery.

3. The device of claim 2 wherein after reaching said delivery position the distributor cylinder passes through a second isolating position permitting the removal of the filled container, and thereby isolating the remaining adherent mass of pasty product attached to the plunger after delivery of pasty product into the filled container.

4. The device of claim 2 wherein said distributor cylinder passes through another delivery position in which said metering plunger is displaced from its said intermediate position towards its said reference position so as to deliver into said axial conduit the remaining adherent mass of pasty product attached to said plunger, said axial conduit being sized so that said delivered adherent mass does not extend beyond the axial conduit through the second opening in said distribution cylinder.

5. The device of claim 1 wherein said second opening in said distribution cylinder is also substantially of the same cross-section as said metering plunger so that, in the delivery position, said metering plunger penetrates totally into said axial conduit of said distributor slide and emerges from said distribution cylinder through said second opening.

6. A device for volumetric metering of pasty products into a container comprising:
a metering chamber provided, at one of its ends, with a common filling and delivery opening,
a metering plunger is disposed within the metering chamber and is movable axially between a reference position, wherein no residual volume of the pasty product remains inside the metering chamber, to a raised position, wherein a metered volume of pasty product is received within said metering chamber,
means for supplying the pasty product under pressure into said metering chamber,
a distribution cylinder disposed transversely relative to the metering chamber and provided laterally with a first opening defining said filling and delivery opening of said metering plunger, a second opening disposed axially opposite to said first opening, and a third opening offset axially relative to the other two said openings and in communication with said means for supply of pasty product,
said distribution cylinder including a distributor slide having a lateral conduit for communication between first and second positions offset axially relative to each other, and an axial conduit for communication betwen first and second positions disposed axially opposite to each other, said distributor slide being moveable axially between:
(a) a filling position, wherein the lateral conduit is moved such that said first and third openings are opened into communication with one another and said second opening of the distribution cylinder is closed so as to permit filling of said metering chamber via said supply means,
(b) an isolating position, wherein after said metering plunger reaches its raised position, each of said three openings of said distribution cylinder is closed,
(c) a delivery position, wherein while the metering plunger is lowered towards its said reference position, the third opening remains closed, and said axial conduit is moved so that the said first and second openings are opened so as to deliver a portion of pasty product into the container which is placed opposite to said second opening, and when said metering plunger reaches its said reference position, said metering plunger is positioned with respect to said distribution cylinder such that no quantity of pasty product is contained within said second opening after delivery of the pasty product into said container,
and wherein said first opening in said distribution cylinder and said axial conduit of said distributor slide are substantially of the same cross-section as the metering plunger so that, in the delivery position, said metering plunger can be lowered beyond its said reference position so as to penetrate into said axial conduit of said distributor slide, and
means for selective actuation of said metering plunger and distributor slide for movement of the same.

7. The device of claim 6 wherein said second opening in said distribution cylinder is also substantially of the same cross-section as said metering plunger so that, in the delivery position, said metering plunger penetrates totally into said axial conduit of said distributor slide and emerges from said distribution cylinder through said second opening.

* * * * *

UNITED STATES PATENT AND TRADEMARK OFFICE
CERTIFICATE OF CORRECTION

PATENT NO. : 5,172,835
DATED : December 22, 1992
INVENTOR(S) : Robert Hudkovic, Erich Mengel and Bruno Trachez It is certified that error appears in the above-identified patent and that said Letters Patent is hereby corrected as shown below:

ON THE COVER PAGE

Item (54), and column 1, in the title, "PAST" should read --PASTE--.

Item (75) inventors; "Robert Hudcovic should read --Robert Hudcovic--.

Signed and Sealed this

First Day of February, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,172,835
DATED : December 22, 1992
INVENTOR(S) : Robert Hudkovic, et al It is certified that error appears in the above-indentified patent and that said Letters Patent is hereby corrected as shown below:

On the title page, item [73] Assignee: "Unisabi, S.A." should be changed to --Unisabi S.A. Specialities Alimentaires pour Animaux--.

Signed and Sealed this

Twentieth Day of September, 1994

Attest:

BRUCE LEHMAN

*Attesting Officer*  *Commissioner of Patents and Trademarks*